US012798290B2

(12) United States Patent
Fujita et al.

(10) Patent No.: US 12,798,290 B2
(45) Date of Patent: Nov. 17, 2026

(54) VEHICLE WHEEL SUPPORTING DEVICE

(71) Applicant: TOYOTA JIDOSHA KABUSHIKI KAISHA, Toyota (JP)

(72) Inventors: Hironori Fujita, Toyota (JP); Keisuke Yamada, Toyota (JP); Takeshi Murayama, Toyota (JP); Yoshihiko Hagio, Nagoya (JP); Masayoshi Kobayashi, Toyota (JP); Toru Neichi, Okazaki (JP); Hirotaka Ikegami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 155 days.

(21) Appl. No.: 18/743,960

(22) Filed: Jun. 14, 2024

(65) Prior Publication Data

US 2025/0100324 A1 Mar. 27, 2025

(30) Foreign Application Priority Data

Sep. 22, 2023 (JP) ................................ 2023-158455

(51) Int. Cl.
*B60B 27/00* (2006.01)
*F16C 33/72* (2006.01)
*F16C 33/80* (2006.01)
*F16C 41/00* (2006.01)

(52) U.S. Cl.
CPC ...... *B60B 27/0073* (2013.01); *B60B 27/0068* (2013.01); *F16C 33/723* (2013.01); *F16C 33/805* (2013.01); *F16C 41/007* (2013.01); *F16C 2326/02* (2013.01)

(58) Field of Classification Search
CPC .. F16C 19/183–188; F16C 19/383–388; F16C 33/723; F16C 33/805; F16C 41/007; F16C 2233/00; F16C 2326/02; B60B 27/0068; B60B 27/0073
See application file for complete search history.

(56) References Cited

U.S. PATENT DOCUMENTS 6,267,509 B1 * 7/2001 Morimura ........... F16C 33/7886 324/174
2005/0175267 A1 * 8/2005 Joki ...................... B60B 27/001 384/448

FOREIGN PATENT DOCUMENTS

| | | | | | |
|---|---|---|---|---|---|
| CA | 2727216 | A1 * | 8/2011 | .............. B60T 8/329 |
| JP | 2009162677 | A * | 7/2009 | ............ F16C 41/007 |
| JP | 2010106924 | A * | 5/2010 | ............ F16C 41/007 |
| JP | 2010230080 | A * | 10/2010 | ............ F16C 41/007 |
| JP | 2013-160281 | A | 8/2013 | |
| JP | 2014-009731 | A | 1/2014 | |
| JP | 2015-071339 | A | 4/2015 | |

(Continued)

OTHER PUBLICATIONS

Machine Translation of WO-2008152987-A1 (Year: 2008).*

(Continued)

*Primary Examiner* — Alan B Waits
(74) *Attorney, Agent, or Firm* — Sughrue Mion, PLLC

(57) ABSTRACT

A vehicle wheel supporting device includes a hub bearing rotatably supporting a wheel, a hub carrier supporting the hub bearing, a sensor configured to detect a rotating state of the wheel, a cap configured to prevent an entry of foreign material into an inside of the hub bearing, and a deflector configured to isolate the sensor from the foreign material. The deflector is fixed to the cap.

3 Claims, 4 Drawing Sheets

(56) References Cited

FOREIGN PATENT DOCUMENTS

| | | | | | |
|---|---|---|---|---|---|
| WO | WO-2008152987 | A1 * | 12/2008 | ............ | F16C 41/007 |
| WO | WO-2012077685 | A1 * | 6/2012 | ............ | F16C 41/007 |

OTHER PUBLICATIONS

Machine Translation of JP-2009162677-A (Year: 2009).*
Machine Translation of JP-2010106924-A (Year: 2010).*
Machine Translation of JP-2010230080-A (Year: 2010).*
Machine Translation of CA-2727216-A1 (Year: 2011).*
Machine Translation of WO-2012077685-A1 (Year: 2012).*

* cited by examiner

VEHICLE WHEEL SUPPORTING DEVICE

REFERENCE TO RELATED APPLICATIONS

This application claims priority from Japanese Patent Application No. 2023-158455 filed on Sep. 22, 2023. The entire content of the priority application is incorporated herein by reference.

BACKGROUND ART

The present disclosure relates to a vehicle wheel supporting device.

In the related art, for example, there has been known an arrangement of a knuckle, that is, a form of a hub carrier, a hub bearing, a drive shaft, and a deflector disclosed in Japanese Patent Application Publication No. 2015-071339. In the prior art, the drive shaft is disposed in a drive wheel which is connected to a rotational axis of a hub bearing supported on a hub carrier, and the deflector is fixed to the drive shaft.

SUMMARY

On a drive wheel side, a sensor configured to detect a rotation state of the wheel is fixed to the hub carrier. Here, the hub carrier is disposed in an environment in which foreign matter such as water, sand, or mud is likely to enter the hub carrier, while driving, particularly from a vehicle inner side in a right and left direction of the vehicle, that is, from a side opposite to a vehicle outer side where the wheel is connected to a rotating shaft body. Therefore, the sensor fixed to the hub carrier is disposed in an environment in which foreign matter is likely to adhere.

Here, the sensor is required to maintain good detection accuracy even in an environment in which foreign matter is likely to adhere. Therefore, the deflector provided on the drive wheel is fixed to the drive shaft disposed on the vehicle inner side of the hub carrier so as to prevent foreign matter from adhering to the sensor disposed so as to be opposed to the hub bearing.

Even in the case of a driven wheel that does not include a drive shaft, it is necessary to prevent foreign matter from adhering to the sensor, and it is necessary to detect the rotational state of the wheel with good detection accuracy. However, in the driven wheel, the above described deflector cannot be fixed to the driven wheel because the driven wheel does not have the drive shaft.

For this reason, for example, when the sensor is fixed to the hub carrier in the driven wheel similarly to the drive wheel, a dedicated hub carrier disposed in the driven wheel may be adopted. In this case, the dedicated hub carrier is configured such that the dedicated hub carrier closes a vehicle inner side in an accommodating hole portion accommodating the hub bearing. In a case where the dedicated hub carrier is used in the driven wheel, the accommodating hole portion is closed by the dedicated hub carrier in the driven wheel, thereby preventing foreign matter from adhering to the sensor.

Further, when the dedicated hub carrier is not adopted, for example, a cap configured to protect an internal structure such as an outer ring, rolling balls, and an inner ring of a hub bearing may be provided. In this case, the cap is embedded so that at least a detection portion of the sensor enters into an inside of the cap. In a case where the cap is provided, the sensor is embedded into the cap, thereby preventing foreign matter from adhering to the sensor.

As described above, in order to prevent foreign matter from adhering to the sensor, specifications of the hub carrier may be different between the drive wheel side and the driven wheel side. When the sensor is fixed to the hub carrier on the drive wheel side and the sensor is fixed to the cap on the driven wheel side, specifications of the hub carrier and the sensor may be different and specifications of a wire harness, a connector, and the like connected to the sensor may be different. That is, in the related art, the hub carrier, the sensor, the wire harness, and the connector need to be produced and managed as different components on the drive wheel side and the driven wheel side, and separate assembly operations need to be performed. Therefore, there is still room for improvement in terms of achieving commonality of components while preventing adhesion of foreign matter to the sensor.

An object of the present disclosure is to provide a vehicle wheel supporting device capable of achieving commonality of components.

An aspect of the present disclosure relates to a vehicle wheel supporting device including a hub-bearing rotatably supporting a wheel, a hub-carrier supporting the hub-bearing, a sensor configured to detect a rotating state of the wheel, a cap configured to prevent an entry of foreign material into an inside of the hub-bearing, and a deflector configured to isolate the sensor from the foreign material. The deflector is fixed to the cap.

According to the vehicle wheel supporting device of the present disclosure, the deflector is fixed to the cap. As a result of this, the deflector can be used even in a driven wheel that does not include a drive shaft. Therefore, also in the driven wheel, since the deflector can isolate a detection portion of the sensor from foreign matter, it is possible to prevent foreign matter from adhering to the sensor. Since the deflector can prevent foreign matter from adhering to the sensor, the sensor can be fixed to the hub carrier also in the driven wheel. Therefore, according to the vehicle wheel supporting device of the present disclosure, since the commonality of the deflector can be achieved in the drive wheel and the driven wheel, the commonality of the hub carrier, the sensor, the wire harness, and the connector can also be achieved.

BRIEF DESCRIPTION OF DRAWINGS

The objects, features, advantages, and technical and industrial significance of the present disclosure will be better understood by reading the following detailed description of an embodiment, when considered in connection with the accompanying drawings, in which.

DESCRIPTION

Hereinafter, a vehicle wheel supporting device according to an embodiment of the present disclosure will be described in detail with reference to the drawings.

Figure 1:
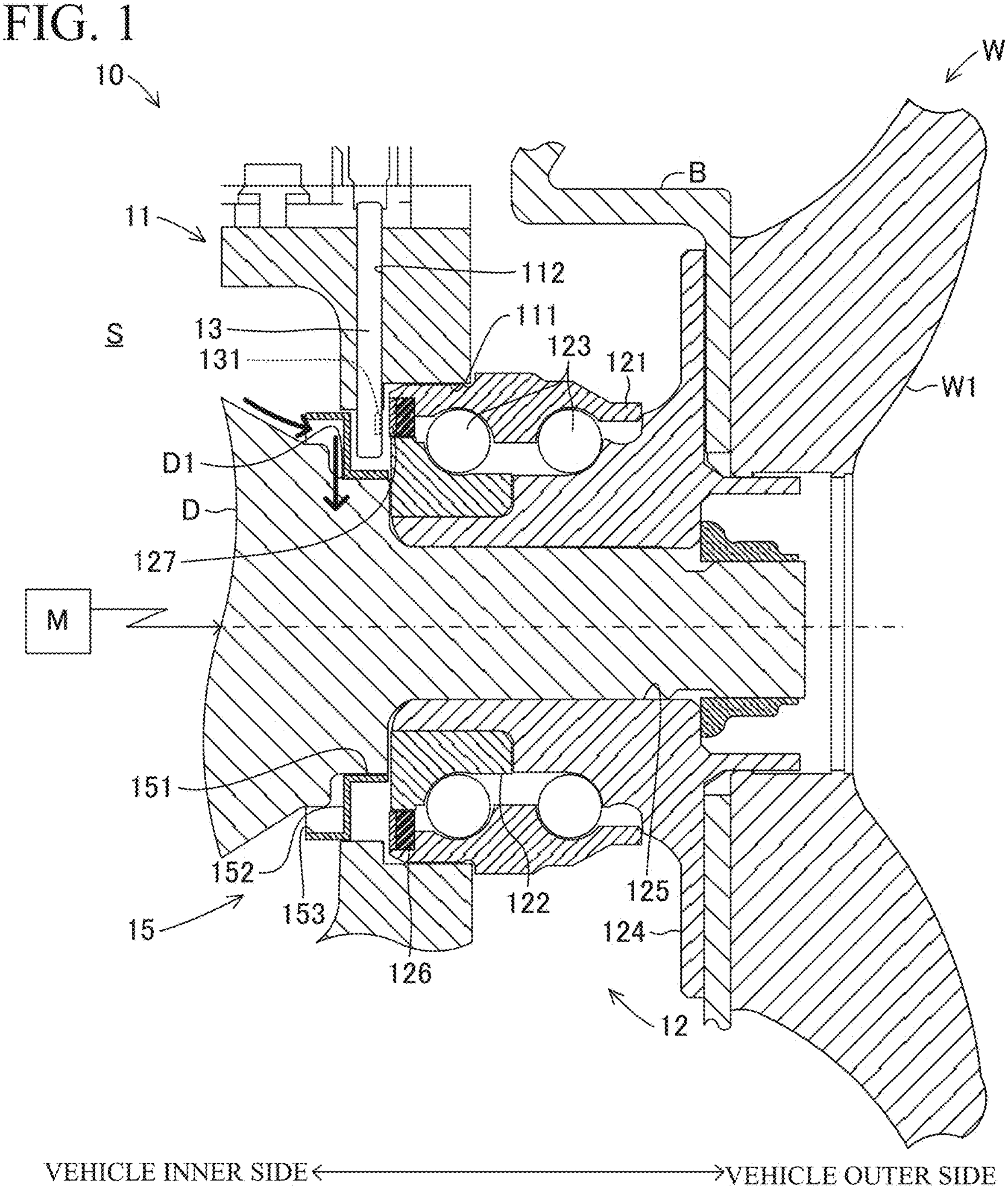
FIG. 1 is a schematic view of a vehicle wheel supporting device for a drive wheel.
Figure 2:
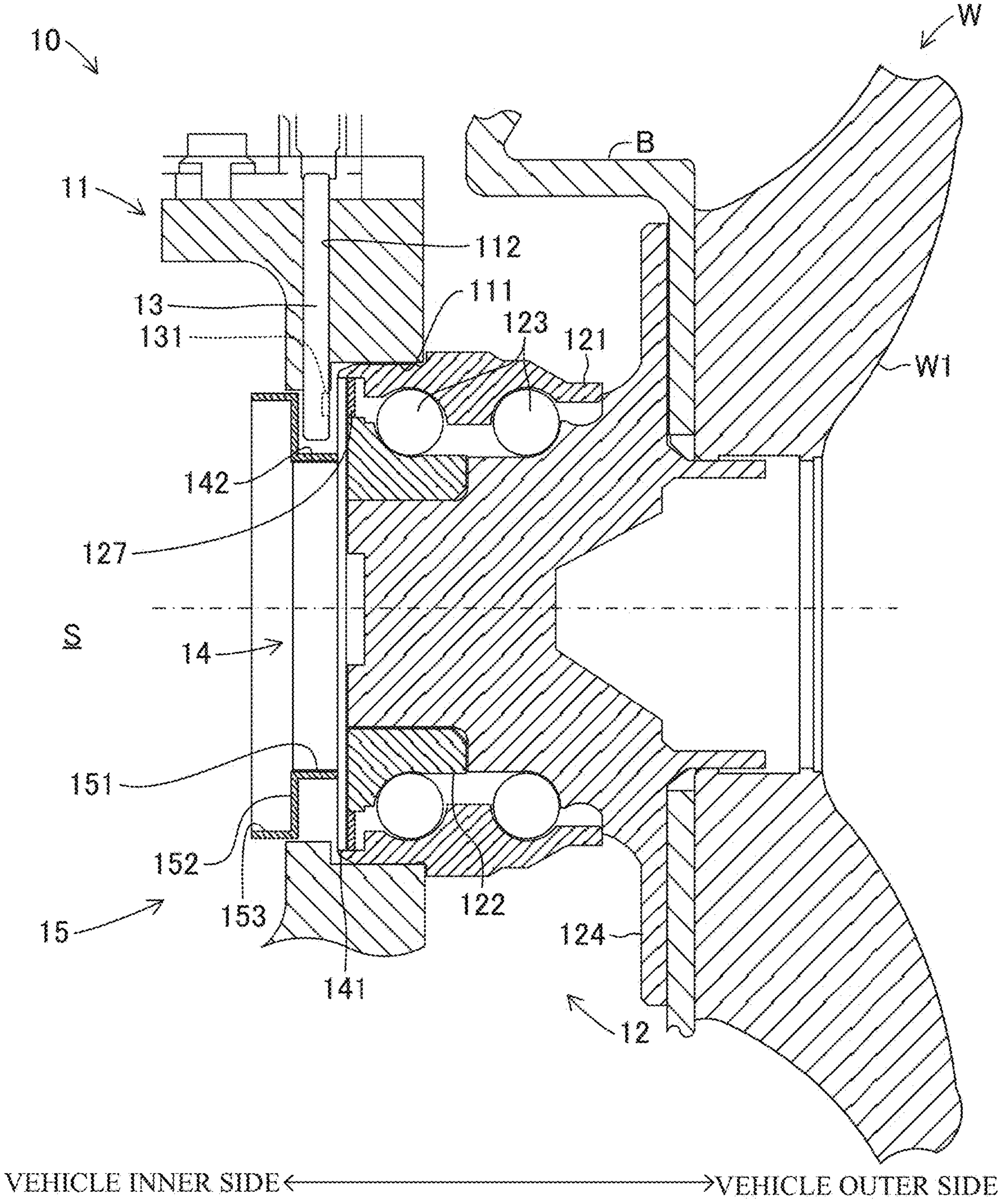
FIG. 2 is a schematic view of a vehicle wheel supporting device for a driven wheel.

As shown in FIGS. 1 and 2, a vehicle wheel supporting device 10 of the present embodiment includes a hub carrier 11 and a hub bearing 12. Moreover, the vehicle wheel supporting device 10 includes a sensor 13, a cap 14, and a deflector 15.

The hub carrier 11 includes an accommodating hole portion 111 that accommodates a part of the hub bearing 12. Accordingly, the hub carrier 11 supports the hub bearing 12 in a state in which the hub carrier 11 is accommodated in the accommodating hole portion 111. Here, the hub carrier 11 may be referred to as a "knuckle" when the hub carrier 11 is provided on a steered wheel of a vehicle. In the following description, the hub carrier 11 is referred to as the "hub carrier 11" without distinguishing between the steered wheels and non-steered wheels.

The hub carrier 11 is provided with a fixing portion 112 through which a bar-shaped sensor 13 (hereinafter, also referred to as a "stick sensor 13"), which will be described later penetrates and to which the stick sensor 13 is fixed in a state in which a tip portion of the sensor 13 protrudes from the inner circumferential surface of the accommodating hole portion 111. As a result, when the stick sensor 13 is fixed to the fixing portion 112, a detecting portion 131 provided at the tip portion of the stick sensor 13 protrudes from an inner circumferential surface of the accommodating hole portion 111.

The hub bearing 12 includes an outer ring 121, an inner ring 122, rolling balls 123, and a hub shaft 124. Here, the inner ring 122 and the hub shaft 124 constitute a "rotating shaft body" or "a rotating member". It is noted that, in the present embodiment, a configuration in which the hub bearing 12 includes the rolling balls 123 is exemplified. However, in the hub bearing 12, for example, the hub bearing 12 may include rolling rollers instead of the rolling balls 123.

The outer ring 121 is fixed to the hub carrier 11 by bolts or the like (not shown). The inner circumferential surface of the outer ring 121 and the inner ring 122 cause the rolling balls 123 located on one side to roll. The hub shaft 124 is coupled to the inner ring 122. The inner circumferential surface of the outer ring 121 and the hub shaft 124 cause the rolling balls 123 located on the other side to roll.

The hub shaft 124 is fastened by a bolt and a nut (not shown) in a state where a wheel W1 constituting the wheel W sandwiches a brake disc B at a distal end portion of the hub shaft 124 on a vehicle outer side in a right and left direction of the vehicle, that is, on an outer side of the vehicle in a vehicle width direction. As a result of this, the hub bearing 12 rotatably supports the wheel W (wheel W1) via the inner ring 122 and the hub shaft 124, which are the rotating shaft body.

Here, as illustrated in FIG. 1, in a case where the vehicle wheel supporting device 10 supports a driving wheel as a wheel driven by a driving force source M such as a motor or an internal combustion engine mounted on the vehicle, the vehicle wheel supporting device 10 includes a drive shaft D. In this case, one end of the drive shaft D is coupled to the driving force source M, and the other end of the drive shaft D is coupled to the hub shaft 124 constituting the rotating shaft body of the hub bearing 12.

In this case, therefore, the hub bearing 12 constitutes the drive wheel. In the present embodiment, a case where the drive shaft D is coupled to the hub shaft 124 will be described as an example. However, since the inner ring 122 and the hub shaft 124 are connected to each other, for example, the vehicle wheel supporting device 10 may be configured such that the drive shaft D is connected to the inner ring 122.

A center portion of the hub shaft 124 on the drive wheel side is provided with a spline hole 125, and the drive shaft D can transmit the driving force from the driving force source M in a state in which the drive shaft D penetrates through the spline hole 125. Accordingly, the hub shaft 124 on the drive wheel side can transmit the driving force from the driving force source M to the wheel W as the wheel W1 when the hub shaft 124 spline-fits to the drive shaft D.

Further, the hub bearing 12 provided on the drive wheel side is provided with an annular seal 126, and the annular seal 126 separates a space S into which foreign matter such as water, sand, and mud are allowed to enter and an inside of the hub bearing 12. That is, the annular seal 126 prevents foreign matter from entering between the outer ring 121 and the inner ring 122 so as not to hinder the rolling of the rolling balls 123. As a result of this, an inner structure of the hub bearing 12 on the drive wheel side is protected by the annular seal 126.

Here, for example, a space located inside a tire house in which the wheel W of the vehicle is accommodated and located on the vehicle inner side (the inner side of the vehicle in the vehicle width direction) with respect to the wheel W which is the wheel W1 is exemplified as the space S. More specifically, the space S is exemplified as a space on the vehicle inner side of an end portion of the hub bearing 12 accommodated in the accommodating hole portion 111 of the hub carrier 11 inside the tire house. For example, the foreign matter existing on the road surface is allowed to enter the space S by being rolled up by rotation of the wheel W while driving.

On the other hand, as shown in FIG. 2, when the vehicle wheel supporting device 10 supports a driven wheel as the wheel that is not driven by the driving force source M, the vehicle wheel supporting device 10 does not include the drive shaft D. In this case, the hub bearing 12 is not coupled to the drive shaft D. Therefore, the hub shaft 124 on the driven wheel side is not provided with the spline hole 125 and an inside of the hub shaft 124 is solidly formed. Therefore, in this case, the hub bearing 12 constitutes a part of the driven wheel.

In order to isolate the space S into which foreign matter is allowed to enter from the inside of the hub bearing 12, a cap 14 is liquid-tightly attached to the hub bearing 12 provided on the driven wheel side. That is, the cap 14 prevents foreign matter from entering between the outer ring 121 and the inner ring 122 so that the cap 14 does not inhibit the rolling of the rolling balls 123. As a result of this, an internal structure of the hub bearing 12 on the driven wheel side is protected by the cap 14.

As shown in FIGS. 1 and 2, a magnetized pulser ring 127 is provided on the hub bearing 12. The magnetized pulser ring 127 is a multipolar magnet formed by radially and alternately magnetizing N poles and S poles on an annular base material. The magnetized pulser ring 127 is disposed on the vehicle inner side of the hub bearing 12, and more specifically, the magnetized pulser ring 127 is disposed toward an inside of the accommodating hole portion 111 of the hub carrier 11.

More specifically, on the drive wheel side, as shown in FIG. 1, the magnetized pulser ring 127 is disposed on a vehicle inner side of the annular seal 126. Therefore, on the drive wheel side, the magnetized pulser ring 127 directly opposes to the detecting portion 131 of the stick sensor 13. On the driven wheel side, as shown in FIG. 2, the magnetized pulser ring 127 is disposed on a vehicle outer side of the mounted cap 14, that is, on an inner side of the cap 14. Therefore, on the driven wheel side, the magnetized pulser ring 127 opposes to the detecting portion 131 of the stick sensor 13 across the cap 14.

The sensor 13 detects a rotation state of the inner ring 122 or the hub shaft 124 constituting the rotating shaft body of the hub bearing 12. As shown in FIGS. 1 and 2, the sensor 13 of the present embodiment detects the rotation state of the inner ring 122 constituting the rotating shaft body of the hub bearing 12 around an axis of the inner ring 122, in other words, the rotation state of the wheel W. Here, as the sensor 13, for example, a wheel speed sensor that detects a wheel speed is exemplified. Although a case where the sensor 13 is a wheel speed sensor will be described below, the sensor 13 may be a sensor that detects another physical amount.

As illustrated in FIGS. 1 and 2, the stick sensor 13 includes a detecting portion 131 that is disposed at a tip portion of the stick sensor 13 and detects the rotation state. In a state where the stick sensor 13 is fixed to the fixing portion 112 of the hub carrier 11, the detecting portion 131 protrudes from an inner circumferential surface of the accommodating hole portion 111. The detecting portion 131 opposes to the magnetized pulser ring 127 provided in the hub bearing 12 via an air gap that is a predetermined gap. As a result of this, the stick sensor 13 detects a change of the magnetic flux density and converts the detected change of the magnetic flux density into the rotational speed of the wheel W, that is, the wheel speed.

The cap 14 is formed in a disk shape, and the cap 14 is attached to the hub bearing 12 on the driven wheel side. As shown in FIG. 2, the cap 14 prevents foreign matter from entering the hub bearing 12 from the space S.

Figure 3:
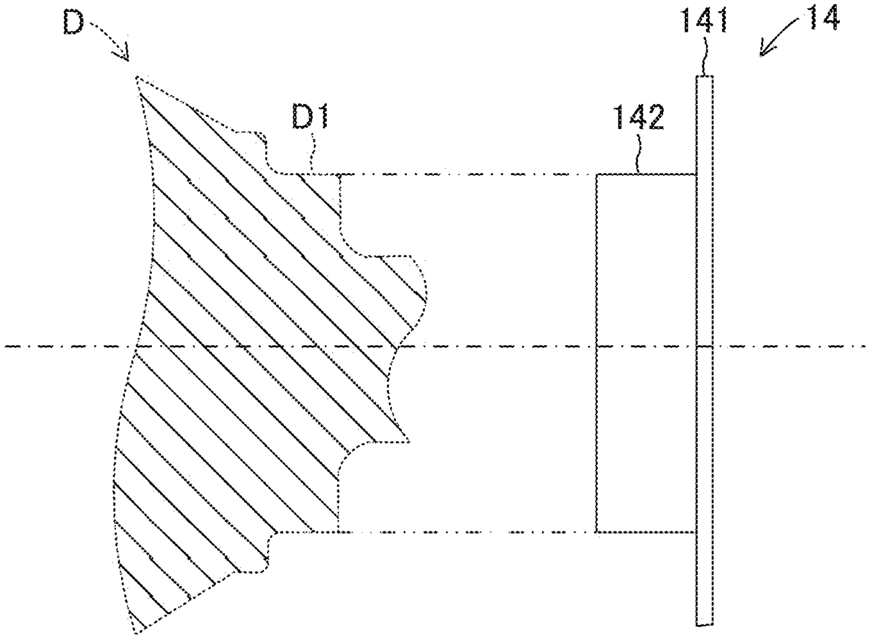
FIG. 3 is a view for explaining a structure of a cap.

The cap 14 is formed by, for example, pressing a thin steel plate using a forming die. As shown in FIG. 3, the cap 14 has a large diameter portion 141 and a step portion 142. The large diameter portion 141 is fixed to the inner circumferential surface of the outer ring 121 of the hub bearing 12. As a result of this, the cap 14 prevents foreign matter from entering the hub bearing 12.

The outer diameter of the step portion 142 is smaller than that of the large diameter portion 141. As indicated by a chain double dashed line in FIG. 3, the outer diameter of the step portion 142 is equal to the outer diameter of a stepped portion D1 of the drive shaft D. The step portion 142 is a predetermined position of the cap 14. Therefore, on the driven wheel side, the deflector 15 is fixed to the step portion 142 of the cap 14. Here, the stepped portion D1 of the drive shaft D is provided at a predetermined position in an axial direction of the drive shaft D. Therefore, the deflector 15 is fixed to the stepped portion D1 of the drive shaft D on the drive wheel side.

The deflector 15 is formed in an annular shape, and the deflector 15 is disposed in the space S such that the detecting portion 131 of the stick sensor 13 fixed to the hub carrier 11 is isolated. The deflector 15 is fixed to the stepped portion D1 of the drive shaft D on the drive wheel side. On the other hand, the deflector 15 is fixed to the step portion 142 of the cap 14 on the driven wheel side. Here, the deflector 15 fixed to the stepped portion D1 of the drive shaft D on the drive wheel side has the same shape as the deflector 15 fixed to the step portion 142 of the cap 14 on the driven wheel side.

Figure 4:
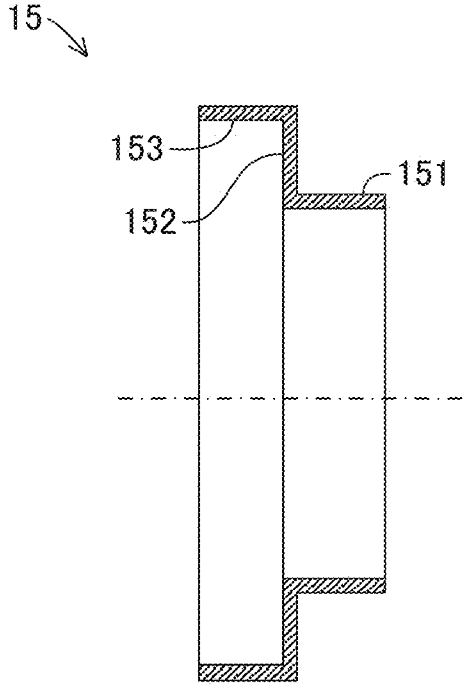
FIG. 4 is a view for explaining a structure of a deflector.

The deflector 15 is formed by, for example, pressing a thin steel plate using a forming die. As shown in FIGS. 1 and 4, the deflector 15 includes a cylindrical portion 151, a disk portion 152, and a repelling portion 153. In the deflector 15 of the present embodiment, as described below, the disk portion 152 extends from an end portion on a vehicle inner side of the cylindrical portion 151 in a direction toward an outer side of a radial direction of the cylindrical portion 151, and the repelling portion 153 extends from an outer circumferential edge of the disk portion 152 in a direction toward the vehicle inner side in the axis direction of the cylindrical portion 151.

An inner diameter of the cylindrical portion 151 is slightly smaller than outer diameters of the stepped portion D1 and the step portion 142. That is, the inner diameter of the cylindrical portion 151 is formed with a dimension having an interference so that the cylindrical portion 151 is fitted to the stepped portion D1 and the step portion 142.

Accordingly, the deflector 15 of the present embodiment is fixed in a state where the cylindrical portion 151 is fitted to the stepped portion D1 or the step portion 142. For example, the deflector 15 of the present embodiment is fixed in a state where the cylindrical portion 151 is press-fitted to the stepped portion D1 or the step portion 142. As described above, since the outer diameters of the stepped portion D1 and the step portion 142 are formed so as to have the same dimension, the commonality of the deflector 15 can be achieved between the drive wheel and the driven wheel.

The disk portion 152 is connected to the cylindrical portion 151 so as to stand from the cylindrical portion 151. Accordingly, the disk portion 152 covers the stepped portion D1 or the step portion 142 so that the disk portion 152 isolates the side surface of the detecting portion 131 of the stick sensor 13 in the space S in a state in which the cylindrical portion 151 is fixed to the stepped portion D1 or the step portion 142. Therefore, in the space S, the disk portion 152 prevents foreign matter scattered toward the detecting portion 131 of the stick sensor 13 from adhering to the detecting portion 131.

The repelling portion 153 is provided along the outer circumferential edge of the disk portion 152. The repelling portion 153 is connected to the disk portion 152 so that the repelling portion 153 stands from the disk portion 152, that is, the repelling portion 153 is coaxial with the cylindrical portion 151. As a result, the repelling portion 153 repels foreign matter that enters from the space S toward the detecting portion 131 of the stick sensor 13.

In the present embodiment, the deflector 15 including the repelling portion 153 is exemplified. However, the repelling portion 153 may be omitted as necessary. That is, in this case, the deflector 15 is constituted by the cylindrical portion 151 and the disk portion 152.

In the vehicle wheel supporting device 10 configured as described above, the deflector 15 is press-fitted and fixed to the stepped portion D1 of the drive shaft D on the drive wheel side, as shown in FIG. 1. As indicated by thick arrows in FIG. 1, the deflector 15 prevents foreign matter scattering toward the detecting portion 131 of the stick sensor 13 from entering the space S.

That is, the disk portion 152 and the repelling portion 153 formed in the deflector 15 inhibit the entry of the foreign matter and prevent the foreign matter from reaching the detecting portion 131. As a result, on the drive wheel side, foreign matter is unlikely to be present in an area near to the detecting portion 131 of the stick sensor 13, particularly in the air gap formed between the detecting portion 131 and the magnetized pulser ring 127. As a result, it is possible to prevent the detection accuracy of the stick sensor 13 from deteriorating.

Figure 5:
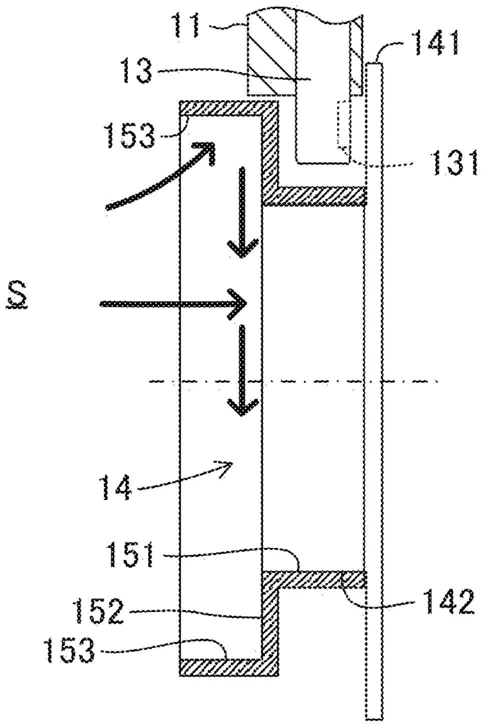
FIG. 5 is a view for explaining prevention of entry of foreign matter by the deflector on a driven wheel side.

On the other hand, as shown in FIG. 5, the vehicle wheel supporting device 10 is configured such that the deflector 15 is press-fitted and fixed to the step portion 142 of the cap 14 on the driven wheel side. As a result of this, the cap 14 prevents entry of foreign matter from the space S toward the inside of the hub bearing 12 as indicated by thick arrows in FIG. 5. The deflector 15 fixed to the step portion 142 of the cap 14 prevents entry of foreign matter scattered toward the detecting portion 131 of the stick sensor 13 in the space S as indicated by the thick arrows in FIG. 5.

That is, also on the driven wheel side, similarly to the driving wheel side, the disk portion 152 and the repelling portion 153 formed in the deflector 15 inhibit entry of foreign matter and prevent the foreign matter from reaching the detecting portion 131. As a result, on the driven wheel side, foreign matter is unlikely to be present in the air gap formed between the detecting portion 131 and the magnetized pulser ring 127 via the large diameter portion 141 of the cap 14. As a result, it is possible to prevent the detection accuracy of the stick sensor 13 from deteriorating.

As can be understood from the above description, the vehicle wheel supporting device 10 includes the hub bearing 12 that rotatably supports the hub shaft 124 (including the coupled inner ring 122) that is the rotating shaft body connected to the wheel W (wheel W1), the hub carrier 11 that has the accommodating hole portion 111 accommodating a part of the hub bearing 12 and supports the hub bearing 12 in a state in which the hub carrier is accommodated in the accommodating hole portion 111, the sensor 13 that is fixed to the fixing portion 112 of the hub carrier 11 in a state in which the detecting portion 131 configured to detect the rotation state protrudes from the inner circumferential surface of the accommodating hole portion 111 so as to detect the rotation state of the inner ring 122 (including the connected hub shaft 124) around the axis of the inner ring 122, the disk-shaped cap 14 that prevents foreign matter from entering the inside of the hub bearing 12 from the space S in which foreign matter is allowed to enter, and the annular deflector 15 disposed so as to isolate the detecting portion 131 from the space S, and the deflector 15 is fixed to the cap 14.

In this case, the hub bearing 12 is configured such that the hub bearing 12 is a part of the driving wheel as the wheel W in the case where the hub shaft 124 (including the coupled inner ring 122) coupled to the wheel is coupled to the drive shaft D configured to transmit the driving force from the driving force source M is, or the hub bearing 12 is a part of the driven wheel as the wheel W in the case where the hub shaft 124 (including the coupled inner ring 122) is not coupled to the drive shaft D. The deflector 15 having the same shape is fixed to the drive shaft D in the driving wheel and is fixed to the cap 14 in the driven wheel.

In this case, the deflector 15 includes the cylindrical portion 151 having an inner diameter formed such that the cylindrical portion 151 is fitted to the stepped portion D1 at the predetermined position in the axial direction of the drive shaft D and is fitted to the step portion 142 at the predetermined position in the cap 14.

In this case, the deflector 15 is fixed by press-fitting the cylindrical portion 151 into the stepped portion D1 at the predetermined position in the axial direction of the drive shaft D and the step portion 142 at the predetermined position in the cap 14.

Further, in these cases, the deflector 15 includes, at the outer circumferential edge of the deflector 15, the repelling portion 153 that repels foreign matter entering from the space S toward the detecting portion 131.

According to the vehicle wheel supporting device 10, the deflector 15 can be fixed to the step portion 142 of the cap 14. As a result, the deflector 15 can be used even in the driven wheel that does not include the drive shaft D. Therefore, also in the driven wheel, the deflector 15 can isolate the detecting portion 131 of the sensor 13 in the space S into which the foreign matter is allowed to enter, so that foreign matter can be prevented from adhering to the sensor 13. Since the deflector 15 can prevent foreign matter from adhering to the sensor 13, the sensor 13 can be fixed to the hub carrier 11 even in the driven wheel. Therefore, according to the vehicle wheel supporting device 10, since the commonality of the deflector 15 is achieved in the drive wheel and the driven wheel, the commonality of each of the hub carrier 11, the sensor 13, the wire harness, and the connector can also be achieved.

Figure 6:
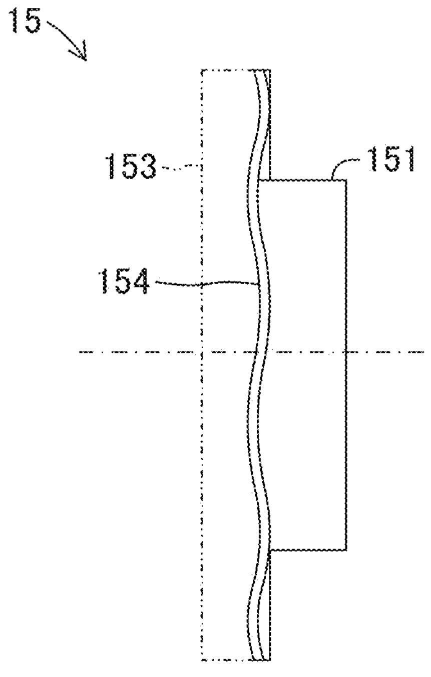
FIG. 6 is a view for explaining a configuration of a deflector according to a modification.

Next, there will be described a modification of the above-described embodiment. In a modification, as shown in FIG. 6, a part of the deflector 15 common to the drive wheel and the driven wheel is changed.

Specifically, the deflector 15 of the modified example includes a disk portion 154 instead of the flat plate-shaped disk portion 152 of the above-described embodiment. A plurality of protrusions and recesses are formed in the disk portion 154 along a circumferential direction of the disk portion 154. As described above, the disk portion 154 on which the plurality of recesses and protrusions are formed rotates around the axis of the drive shaft D, so that foreign matter scattered from the space S is easily repelled by the recesses and protrusions, and adhesion of foreign matter can be suppressed. As a result, entry of foreign matter from the space S toward the detecting portion 131 of the stick sensor 13 can be prevented. With respect to other effects, the same effects as those of the above-described embodiment can be obtained also in the present modification.

What is claimed is:

1. A vehicle wheel supporting device, comprising:

a hub bearing rotatably supporting a wheel;

a hub carrier supporting the hub bearing;

a sensor configured to detect a rotating state of the wheel;

a cap configured to prevent an entry of foreign material into an inside of the hub bearing; and a deflector configured to isolate the sensor from the foreign material, wherein the hub bearing includes an outer ring and an inner ring, wherein the cap includes a first diameter portion and a step portion protruding from the first diameter portion, wherein an outer diameter of the step portion is smaller than an outer diameter of the first diameter portion, wherein the deflector includes a cylindrical portion, a disk portion extending in a direction toward an outer side of a radial direction of the cylindrical portion, and a repelling portion extending from an outer circumferential edge of the disk portion in an axis direction of the cylindrical portion, wherein the first diameter portion of the cap is fixed to an inner circumferential surface of the outer ring of the hub bearing, and wherein the cylindrical portion of the deflector is fixed directly to the step portion of the cap.

2. The vehicle wheel supporting device according to claim 1, wherein the cylindrical portion has an inside diameter such that the cylindrical portion is fitted to the step portion of the cap.

3. The vehicle wheel supporting device according to claim 2, wherein the cylindrical portion of the deflector fixed to the cap is pressed and fitted to the step portion of the cap.

* * * * *